US011335076B1

(12) United States Patent
Nagar et al.

(10) Patent No.: US 11,335,076 B1
(45) Date of Patent: May 17, 2022

(54) VIRTUAL REALITY-BASED DEVICE CONFIGURATION (71) Applicant: International Business Machines Corporation, Armonk, NY (US)

(72) Inventors: Raghuveer Prasad Nagar, Kota (IN); Sarbajit K. Rakshit, Kolkata (IN); Amitava Kundu, Bangalore (IN); Kantharaju P G, Chikkamagalur (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/206,227

(22) Filed: Mar. 19, 2021

(51) Int. Cl.
G06T 19/20 (2011.01)
G06T 19/00 (2011.01)
G16Y 20/10 (2020.01)
G16Y 40/35 (2020.01)

(52) U.S. Cl.
CPC ............ *G06T 19/20* (2013.01); *G06T 19/003* (2013.01); *G16Y 20/10* (2020.01); *G16Y 40/35* (2020.01)

(58) Field of Classification Search
None
See application file for complete search history.

(56) References Cited

U.S. PATENT DOCUMENTS

| 8,341,022 B2 | 12/2012 | Edwards |
| 10,242,501 B1 | 3/2019 | Pusch et al. |
| 2017/0213473 A1* | 7/2017 | Ribeira ................. G16H 40/67 |
| 2019/0139322 A1 | 5/2019 | Besecker et al. |
| 2019/0244537 A1* | 8/2019 | Liberatore ............ G06F 3/0205 |
| 2019/0295327 A1 | 9/2019 | An |
| 2020/0067998 A1 | 2/2020 | Pilnock et al. |

FOREIGN PATENT DOCUMENTS

CN 102592484 A 7/2012

OTHER PUBLICATIONS

Stansfield, "A Distributed Virtual Reality Simulation System for Situational Training", The Massachusetts Institute of Technology, vol. 3, 1994, Abstract Only, 3 pages.
Lewis et al., "Training in surgical oncology—The role of VR simulation", Surgical Oncology, vol. 20, Issue 3, Sep. 2011, Abstract Only, 2 pages.
Mell et al., "The NIST Definition of Cloud Computing", Recommendations of the National Institute of Standards and Technology, Special Publication 800-145, Sep. 2011, 7 pages.

* cited by examiner

*Primary Examiner* — Vu Nguyen
(74) *Attorney, Agent, or Firm* — Timothy J. Singleton (57) ABSTRACT A method, system, and computer program product for virtual reality simulation-based device configuration are provided. The method generates a virtual reality environment for a simulated activity. Interactions of a user are monitored within the virtual reality environment. Based on the interactions of the user, one or more simulated devices used are identified during the simulated activity. The method determines a set of device characteristics for the one or more simulated devices. A set of simulated configurations are determined for the one or more simulated devices based on the set of device characteristics. The method matches a set of configurations for one or more physical devices to the set of simulated configurations for the one or more simulated devices.

11 Claims, 6 Drawing Sheets

VIRTUAL REALITY-BASED DEVICE CONFIGURATION

BACKGROUND

Virtual reality (VR) devices have increased in popularity as the technology has developed. VR devices are used for simulating travel and video game environments.

SUMMARY

According to an embodiment described herein, a computer-implemented method for virtual reality simulation-based device configuration is provided. The method generates a virtual reality environment for a simulated activity. Interactions of a user are monitored within the virtual reality environment. Based on the interactions of the user, one or more simulated devices used are identified during the simulated activity. The method determines a set of device characteristics for the one or more simulated devices. A set of simulated configurations are determined for the one or more simulated devices based on the set of device characteristics. The method matches a set of configurations for one or more physical devices to the set of simulated configurations for the one or more simulated devices.

According to an embodiment described herein, a system for virtual reality simulation-based device configuration is provided. The system includes one or more processors and a computer-readable storage medium, coupled to the one or more processors, storing program instructions that, when executed by the one or more processors, cause the one or more processors to perform operations. The operations generate a virtual reality environment for a simulated activity. Interactions of a user are monitored within the virtual reality environment. Based on the interactions of the user, one or more simulated devices used are identified during the simulated activity. The operations determine a set of device characteristics for the one or more simulated devices. A set of simulated configurations are determined for the one or more simulated devices based on the set of device characteristics. The operations match a set of configurations for one or more physical devices to the set of simulated configurations for the one or more simulated devices.

According to an embodiment described herein, a computer program product for virtual reality simulation-based device configuration is provided. The computer program product includes a computer-readable storage medium having program instructions embodied therewith, the program instructions being executable by one or more processors to cause the one or more processors to generate a virtual reality environment for a simulated activity. Interactions of a user are monitored within the virtual reality environment. Based on the interactions of the user, one or more simulated devices used are identified during the simulated activity. The computer program product determines a set of device characteristics for the one or more simulated devices. A set of simulated configurations are determined for the one or more simulated devices based on the set of device characteristics. The computer program product matches a set of configurations for one or more physical devices to the set of simulated configurations for the one or more simulated devices.

DETAILED DESCRIPTION

The present disclosure relates generally to methods for virtual reality simulation systems. More particularly, but not exclusively, embodiments of the present disclosure relate to a computer-implemented method for physical device configuration based on virtual reality simulations. The present disclosure relates further to a related system for virtual reality simulation systems, and a computer program product for operating such a system.

VR systems allow users to navigate within simulated environments. VR devices are used for entertainment, training scenarios, travel planning, and other similar activities. With respect to training activities, VR systems and platforms offer users an opportunity to interact with new or future scenarios. In such VR systems, users may practice techniques or stimuli in a safe, simulated environment for recruitment and training. However, often VR systems provide challenges to users performing complex or technologically based activities within VR environments. Accurate representations of devices, technology, and real-world characteristics are often difficult to accurately replicate in a virtual environment. Potential or future contexts of real-world situations are also often difficult to anticipate or represent in a virtual environment.

Embodiments of the present disclosure provide an artificial intelligence (AI), internet of things (IoT), and VR-based system to simulate future situations or contexts in a virtual world. Embodiments of the present disclosure enable users to train in a simulated environment and manipulate or configure devices in that simulated world in a manner that accurately reflects real-world circumstances. In some embodiments, the present disclosure enables automated configuration of physical computing devices represented within the simulated VR environment. The automated configuration of physical computing devices may be applied to communication devices, robotic instruments, electromechanical devices, and other devices simulated in a VR environment. Automated configuration of physical computing devices enable users, training for specified events, generate useful device configurations prior to entering real-world situations.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Figure 1:
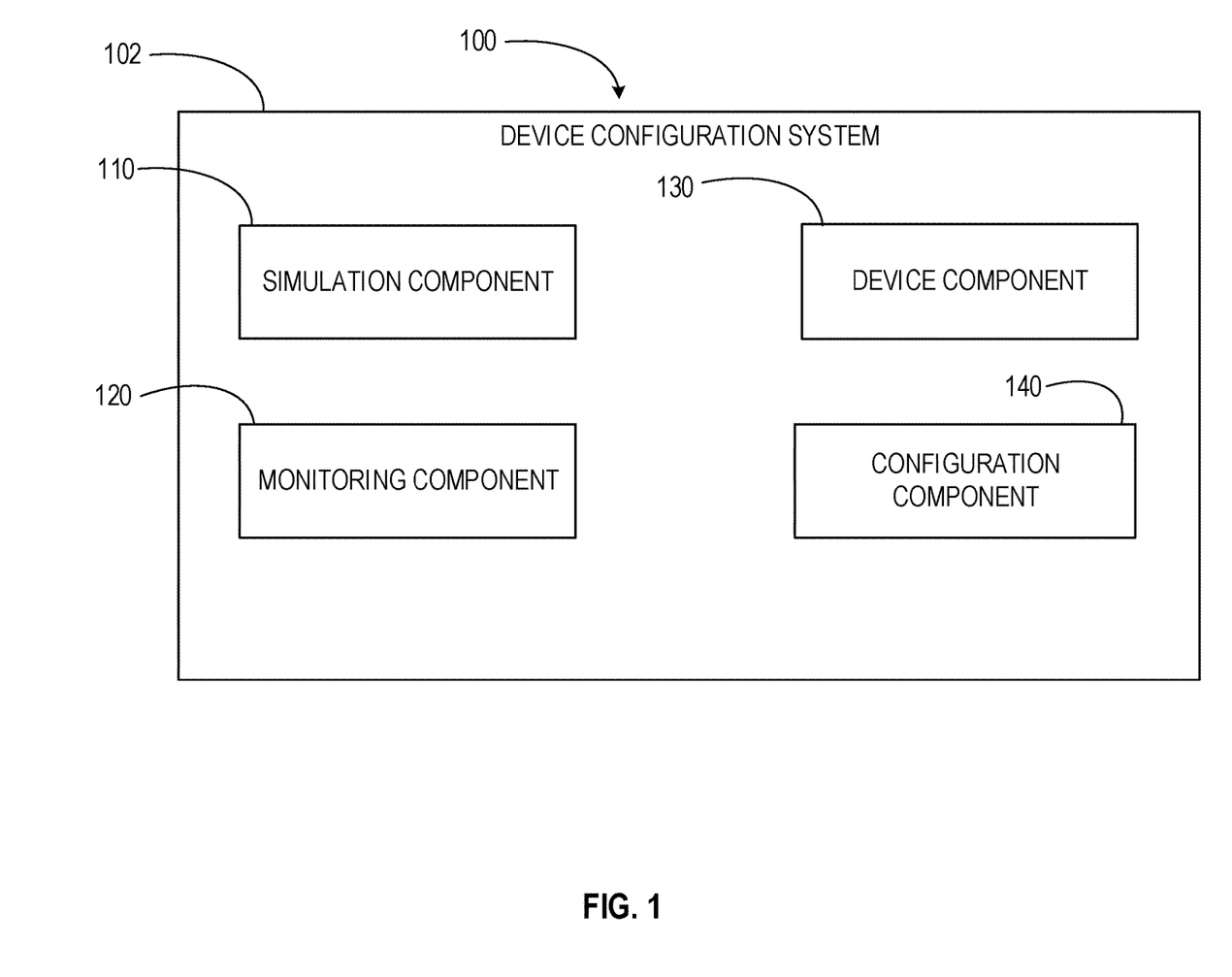
FIG. 1 depicts a block diagram of a computing environment for implementing concepts and computer-based methods, according to at least one embodiment.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a device configuration system 102. The device configuration system 102 may comprise a simulation component 110, a monitoring component 120, a device component 130, and a configuration component 140. The simulation component 110 generates a virtual reality environment for a simulated activity. The monitoring component 120 monitors actions and interactions of users and simulated devices within a virtual reality environment. The device component 130 identifies simulated devices within a virtual reality environment, device characteristics for the simulated devices, and device configurations for the simulated devices. The configuration component 140 matches configurations of physical devices to simulated devices within a virtual reality environment. Although described with distinct components, it should be understood that, in at least some embodiments, components may be combined or divided, and/or additional components may be added without departing from the scope of the present disclosure.

Figure 2:
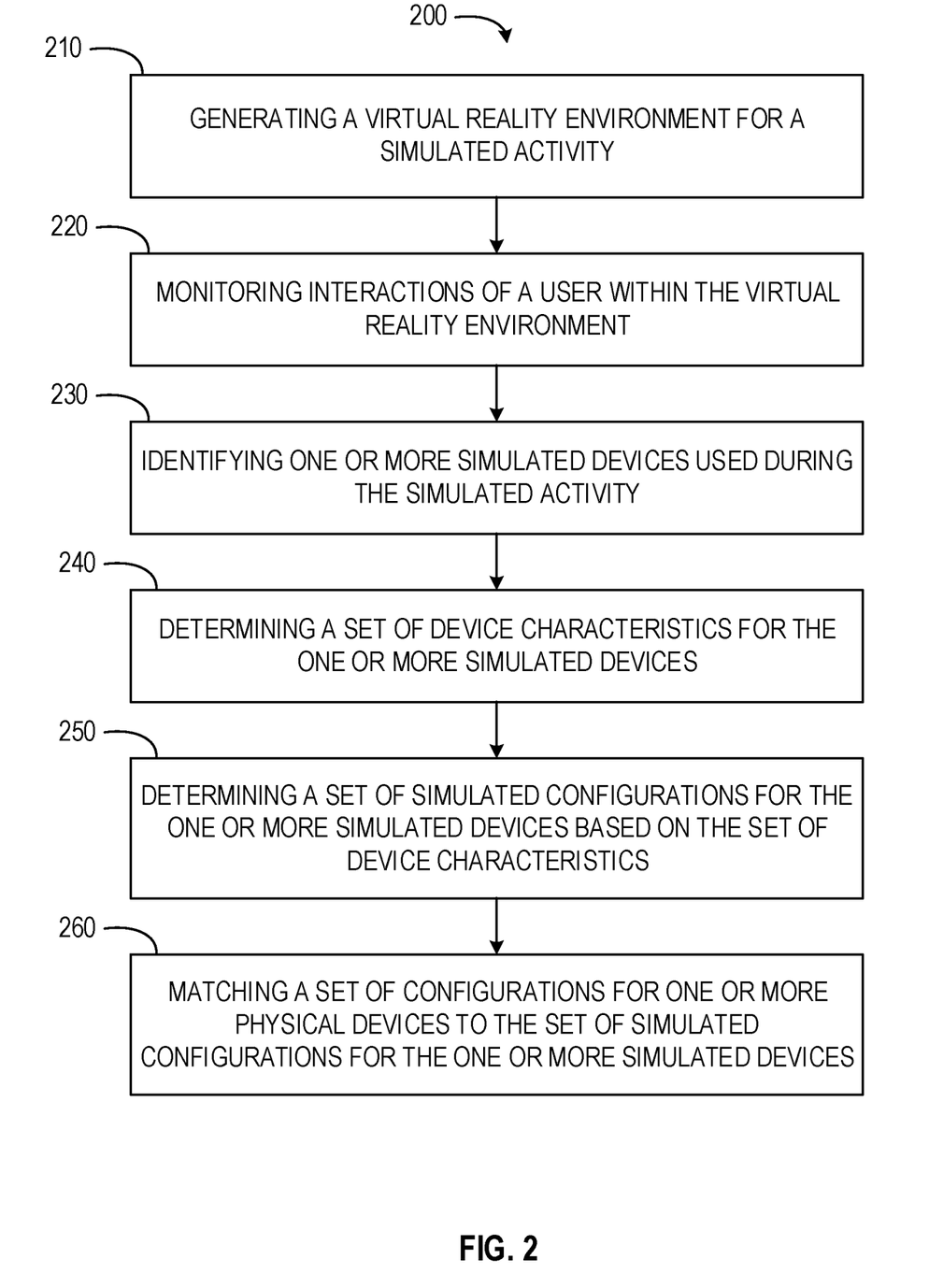
FIG. 2 depicts a flow diagram of a computer-implemented method for virtual reality simulation-based device configuration, according to at least one embodiment.

Referring now to FIG. 2, a flow diagram of a computer-implemented method 200 is shown. The computer-implemented method 200 is a method for virtual reality simulation-based device configuration. In some embodiments, the computer-implemented method 200 may be performed by one or more components of the computing environment 100, as described in more detail below.

At operation 210, the simulation component 110 generates a virtual reality environment. In some embodiments, the virtual reality environment is generated for a simulated activity. The VR environment may simulate future contexts, situations, weather elements, or environments for a user. For example, the simulation component 110 may simulate skill training environments, rescue operations, travel conditions, or any other suitable context in which the user is expected to encounter. In one example, the VR environment may be generated for a rescue operation in a disaster area. The VR environment may be generated for a VR computing device, such that the user may interact with aspects of the VR environment by wearing or otherwise interacting with the VR computing device. In some instances, the VR environment is generated with graphical elements, audio elements, other suitable sensory elements.

At operation 220, the monitoring component 120 monitors interactions of a user within the virtual reality environment. Using the interactions, the monitoring component 120 may determine what types of activities are performed for specified situations or contexts of the VR environment. The monitoring component 120 may also determine how users are performing the types of activities being performed. In some embodiments, the interactions of the user are performed to engage in the simulated activity. The interactions of the user may include performance of simulated activities, operating simulated devices, interactions between a plurality of users of the VR environment, combinations thereof, and any other suitable interaction performed within the VR environment. In some instances, simulated activities can include photography, communication, and collaboration of users. The monitoring component 120 may also monitor one or more biometric information for a user while the user interacts with the VR environment. The monitored biometric information may include heart rate, breathing, eye movement, pupillary response, or any other suitable biometric information authorized for collection by the user.

In some embodiments, the monitoring component 120 monitors interactions of the user by determining an involvement level of the user during the simulated activity. The monitoring component 120 determines a duration of the interactions of the user during the simulated activity. The monitoring component 120 then determines a criticality of the interactions of the user during the simulated activity.

In some instances, the monitoring component 120 also monitors a level of success or results for the user performing the interactions. The level of success or results may indicate a status of results, a successful nature, or other characteristics indicating an appropriateness or efficacy of the interactions. The monitoring component 120 may also monitor failures, lack of success, or challenges associated with the interactions. The failures or challenges may indicate a negative level of efficacy or appropriateness of the interactions.

The monitoring component 120 may monitor the interactions by tracking activities in a VR simulation engine. The monitoring component 120 may track or log events within the VR simulation engine that represent collaboration among users, collaboration among devices, proximity of two or more users within the VR environment, communication collaboration modes (e.g., NFC, Bluetooth, Infrared), and other collaborative elements of user interactions. The monitoring component 120 may also track or log events within the VR simulation engine representing device connectivity such as available resources, communication signal availability, Wi-Fi connectivity, and other communicative resources. In some instances, the monitoring component 120 tracks or logs events within the VR simulation engine related to power availability.

In the example of the VR environment generated for the rescue operation in the disaster area, the monitoring component 120 may monitor and track interactions within the VR simulation engine which indicate participation of a user within the VR environment. The participation may include pairing of simulated devices to enable communication between multiple users. The monitoring component 120 may track authentications used for pairing of the simulated devices. The monitoring component 120 may track creation of storage space within the simulated devices.

The monitoring component 120 may also monitor historical activity performance data. the historical activity performance data may be gathered for or from different contextual situations. In some instances, the contextual situations are related to, but not the same as, a contextual situation of the VR environment. The monitoring component 120 may track the historical activity performance data from videos, news articles, device logs, and other suitable sources. Based on the historical activity performance data, the monitoring component 120 and the simulation component 110 may cooperate to generate VR content simulation rules for future VR environment generation.

At operation 230, the device component 130 identifies one or more simulated devices used during the simulated activity. The device component 130 may also identify how the one or more simulated devices are used during the simulated activity, and how the devices are used to perform varying types of activities being performed by the user. In some embodiments, the one or more simulated devices are identified based on the interactions of the user. The device component 130 may cooperate with the monitoring component 120 to determine the one or more simulated devices as devices used by the user while the user interacts with the VR environment. In some instances, the one or more simulated devices are determined based on a frequency of interactions with simulated devices. For example, the one or more simulated devices may be selected from a plurality of simulated devices available for use by the user within the VR environment.

The selected devices may represent a subset of simulated devices with which the user interacted most. In some instances, the selected devices are devices used for an amount of time above a time threshold. The selected devices may also be determined based on a level of criticality of the device to activities performed by the user. In some instances, the selected devices may be identified based on a pattern of activities identified during interactions in the VR environment.

At operation 240, the device component 130 determines a set of device characteristics for the one or more simulated devices. The set of device characteristics may include specifications or configurations for the one or more simulated devices. The set of device characteristics may also include configurations or specifications of the one or more simulated devices during interaction with the user. The configurations of simulated devices may include device pairing capabilities, authentication capabilities, information sharing capabilities, and other suitable and relevant capabilities. The set of device characteristics may also include power levels, power requirements, local storage, online data storage, offline data storage, connectivity type, usage scenarios, resource requirements, and any other suitable device characteristics relating to use of the one or more simulated devices within the virtuality reality environment.

At operation 250, the device component 130 determines a set of simulated configurations for the one or more simulated devices. In some embodiments, the set of simulated configurations are determined based on the set of device characteristics. The set of simulated configurations may be determined based on the pattern of activities identified during interactions within the VR environment. In some instances, the device component 130 determines the set of simulated configurations for the one or more simulated devices as a set of settings for each device. The set of settings may be selected from the set of simulated configurations based on the pattern of activities. In such instances, the set of settings are selected to provide an appropriate specification of each simulated device so that a user can perform the activities of the VR environment in a correct, proper, or suitable manner. For example, a simulated configuration may be generated to include a power saving mode and active Bluetooth connectivity where those settings are available within the set of device characteristics and the user pattern of activities indicates a need to share information among devices, over an extended period of time, and in environments lacking Wi-Fi connectivity.

In some instances, the device configuration system 102 uses the data gathered in operations 220, 230, 240, and 250 to generate subsequent VR environments for the same or difference contexts, situations, or activities. The VR environments generated using the monitored and historical device and user activity data may be dynamically created for a user. The VR environments may be dynamically created based on user activities and a context of a VR surrounding.

At operation 260, the configuration component 140 matches a set of configurations for one or more physical devices to the set of simulated configurations for the one or more simulated devices. In some embodiments, the configuration component 140 automatically matches the set of configurations for the one or more physical devices to the set of simulated configurations for the one or more simulated devices. In some embodiments, automatic matching of configurations is performed in response to an event identification. The event identification may include determining an event is detected which matches simulated activities of the user within the VR environment. In some embodiments, the configuration component 140 matches the set of configurations for the one or more physical devices by changing one or more settings, preferences, or configuration aspects of the one or more physical devices. The configuration component 140 may change the one or more settings of the one or more physical devices using a physical or tethered connection between the one or more physical devices and the device configuration system 102. The configuration component 140 may also change the one or more settings of the one or more physical devices using a wireless connection established between the one or more physical devices and the device configuration system 102. The set of configurations may be changed at a specified time, automatically at a time of the event identification, or any other suitable time. For example, when an event is identified which matches a simulated event, the configuration component 140 may match the set of configurations for one or more physical devices in communication with the configuration component 140. In such instances, the one or more physical devices may be continually reconfigured based on current or expected events identified by the device configuration system 102.

In some embodiments, the configuration component 140 determines one or more additional physical devices, and configurations for those additional physical devices, based on the information identified in operations 220, 230, 240, and 250.

Figure 3:
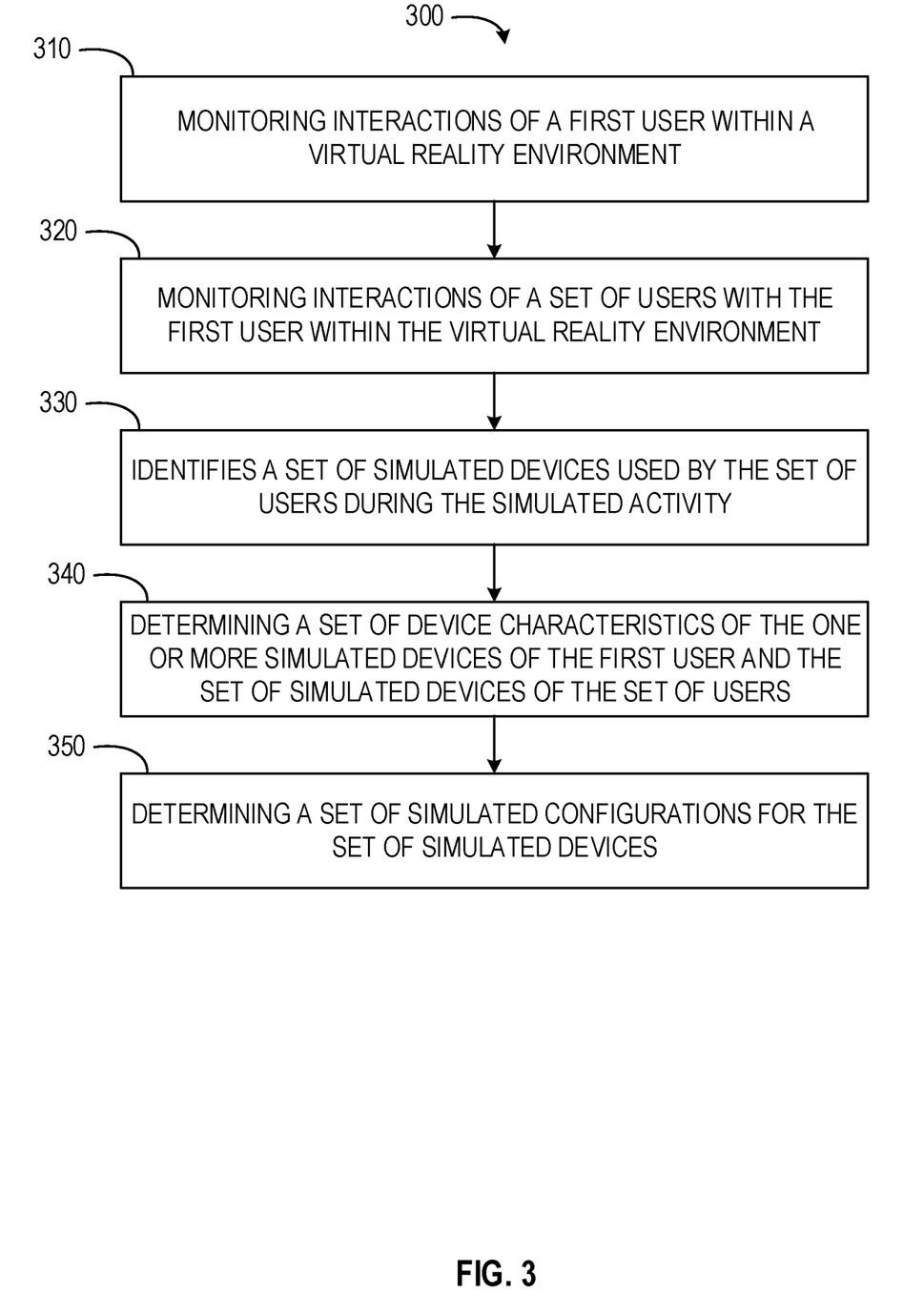
FIG. 3 depicts a flow diagram of a computer-implemented method for virtual reality simulation-based device configuration, according to at least one embodiment.

FIG. 3 shows a flow diagram of an embodiment of a computer-implemented method 300 for virtual reality simulation-based device configuration. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the monitoring component 120 monitors interactions of a first user within a virtual reality environment. The monitoring component 120 may monitor interactions of the first user interacting with a VR surrounding or environment. For example, the interactions may include performing specified tasks or reacting to stimuli or situations generated within the VR environment. The monitor component 120 may monitor interactions of the first user interacting with other users within the VR environment. In some embodiments, the monitoring component 120 monitors interactions of the first user with a set of simulated devices. Interactions with the set of simulated devices may include which devices are used or acted upon by the user, how the devices are employed by the user, what tasks are performed with the devices, how the tasks are performed with each device, a type of each device, the settings or characteristics of the devices as established by the user, resource requirements of each device, time taken to perform tasks, time between tasks, success or failure rate of tasks, success or failure rate of devices, success or failure rate of tasks or interactions based on device type, combinations thereof, and any other discernable interaction, action, or response of the user within the VR environment. In some embodiments, the monitoring component 120 monitors the interactions in a manner similar to or the same as described above with respect to operation 220.

In operation 320, the monitoring component 120 monitors interactions of a set of users within the virtual reality environment. In some embodiments, the set of users interact with the first user within the virtual reality environment. In some instances, the monitoring component 120 monitors interactions of one or more users of the set of users interacting with the first user. In some embodiments, the monitoring component 120 monitors interactions of the set of users occurring between users of the set of users. The monitoring component 120 may monitor the interactions of the set of users in a manner similar to or the same as described above with respect to operations 220 and 310.

In operation 330, the device component 130 identifies a set of simulated devices used by the set of users during the simulated activity. In some embodiments, the set of simulated devices are identified based on the interactions of the set of users. The device component 130 may also identify interactions between the set of simulated devices used by the set of users and the first user. The device component 130 may identify the set of simulated devices in a manner similar to or the same as described above with respect to operation 230.

In operation 340, the device component 130 determines a set of device characteristics for the one or more simulated devices of the first user and the set of simulated devices of the set of users. In some embodiments, the set of device characteristics for the one or more simulated devices are determined based on the interactions of the set of users and the set of simulated devices. The set of device characteristics for the one or more simulated devices may also be determined based on interactions between the set of simulated devices. In some embodiments, the device component 130 determines the set of device characteristics in a manner similar to or the same as described above with respect to operation 240. In some embodiments, the set of device characteristics include one or more resources used by the set of simulated devices, one or more configurations of the set of simulated devices, and one or more connectivity type between simulated devices of the set of simulated devices.

In operation 350, the device component 130 determines a set of simulated configurations for the set of simulated devices. The set of simulated configurations may be determined as a set of configurations for each simulated device to interact in a manner similar to or the same as monitored within the VR environment. In some embodiments, the set of simulated configurations are determined as configurations for the set of simulated devices interacting with one another. In such instances, the set of simulated configurations includes settings, characteristics, and capabilities to enable the set of simulated devices to perform as a networked group, as monitored within the VR environment. In some embodiments, the device component 130 determines the set of simulated configurations for each simulated device of the set of simulated devices in a manner similar to or the same as described above with respect to operation 250.

Figure 4:
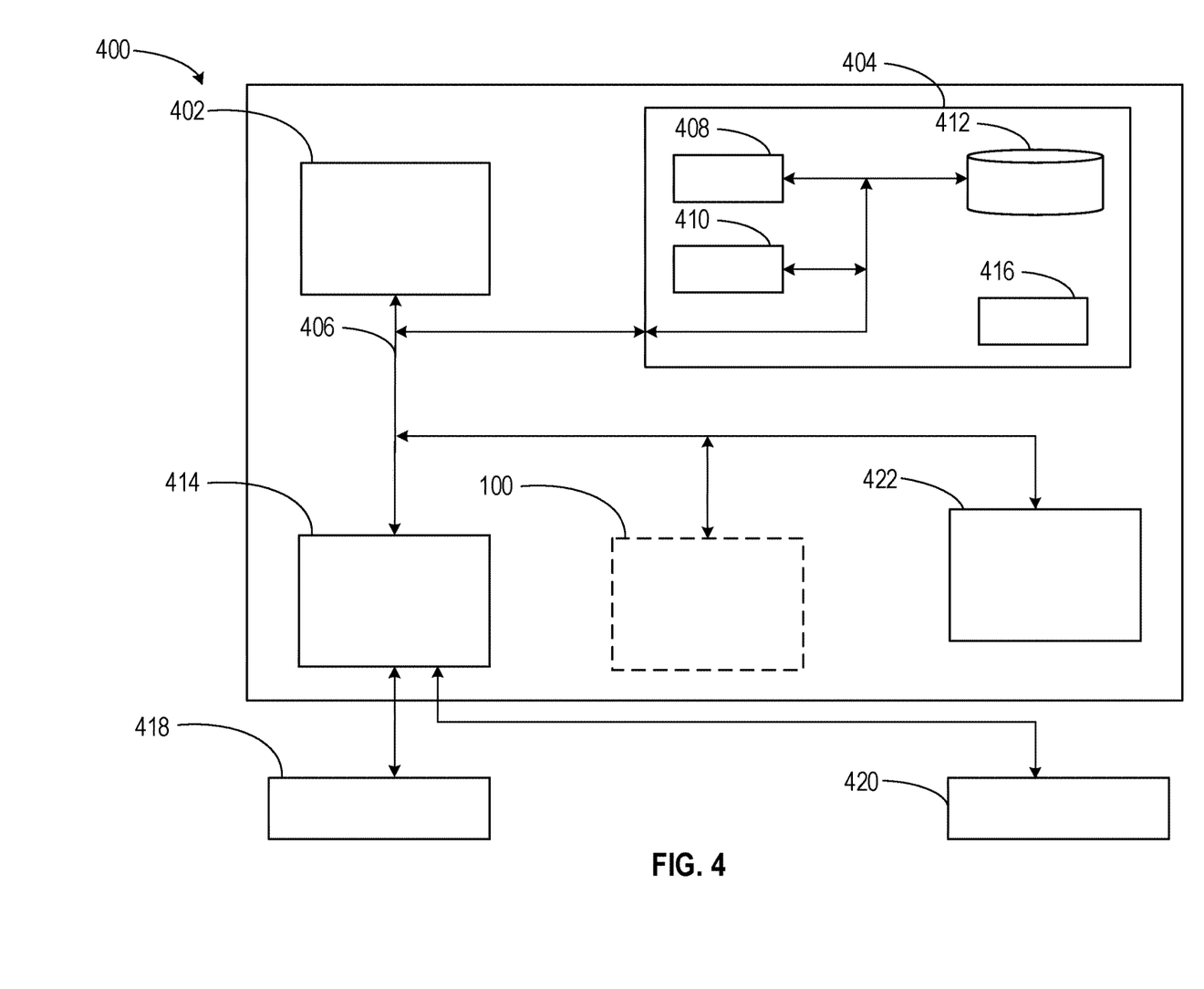
FIG. 4 depicts a block diagram of a computing system for virtual reality simulation-based device configuration, according to at least one embodiment.

Embodiments of the present disclosure may be implemented together with virtually any type of computer, regardless of the platform is suitable for storing and/or executing program code. FIG. 4 shows, as an example, a computing system 400 (e.g., cloud computing system) suitable for executing program code related to the methods disclosed herein and for virtual reality simulation-based device configuration.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the simulation component 110, the monitoring component 120, the device component 130, and the configuration component 140, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
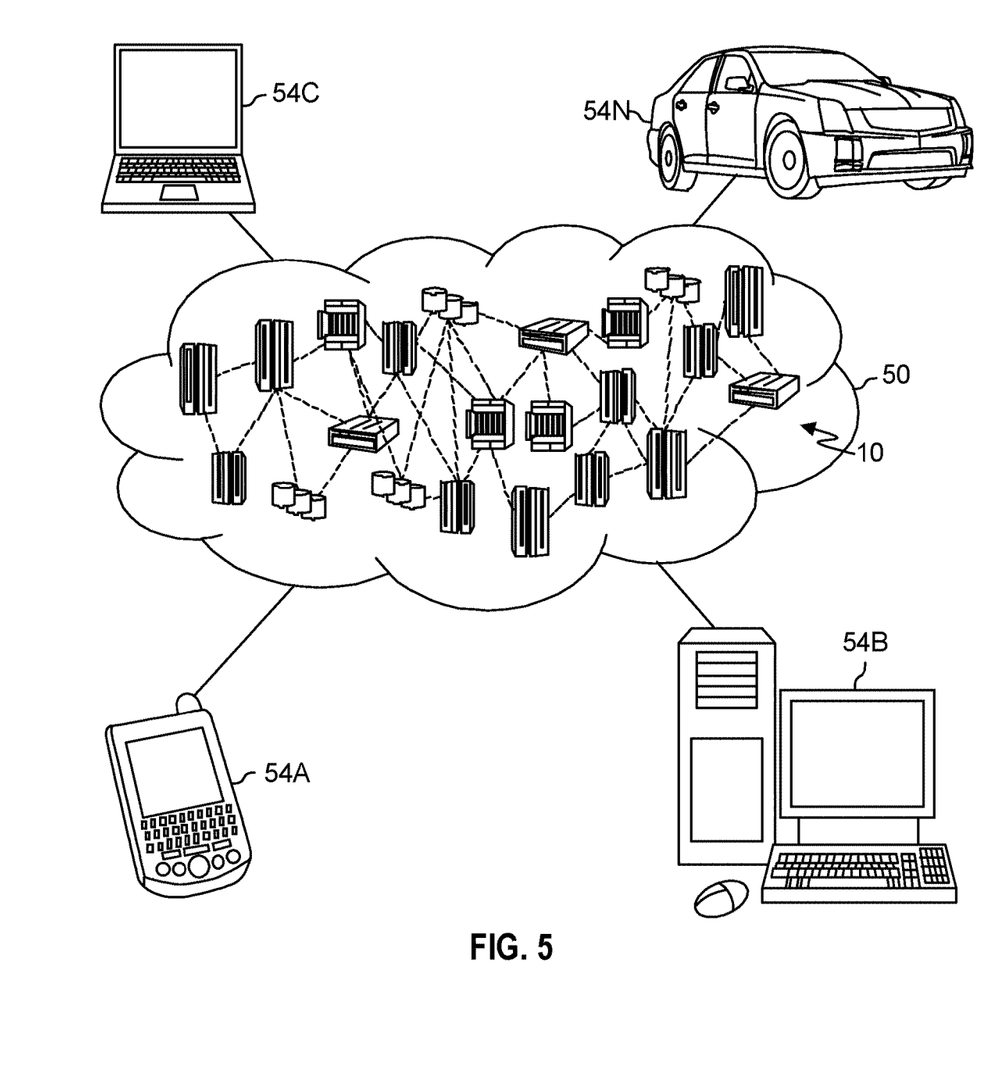
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
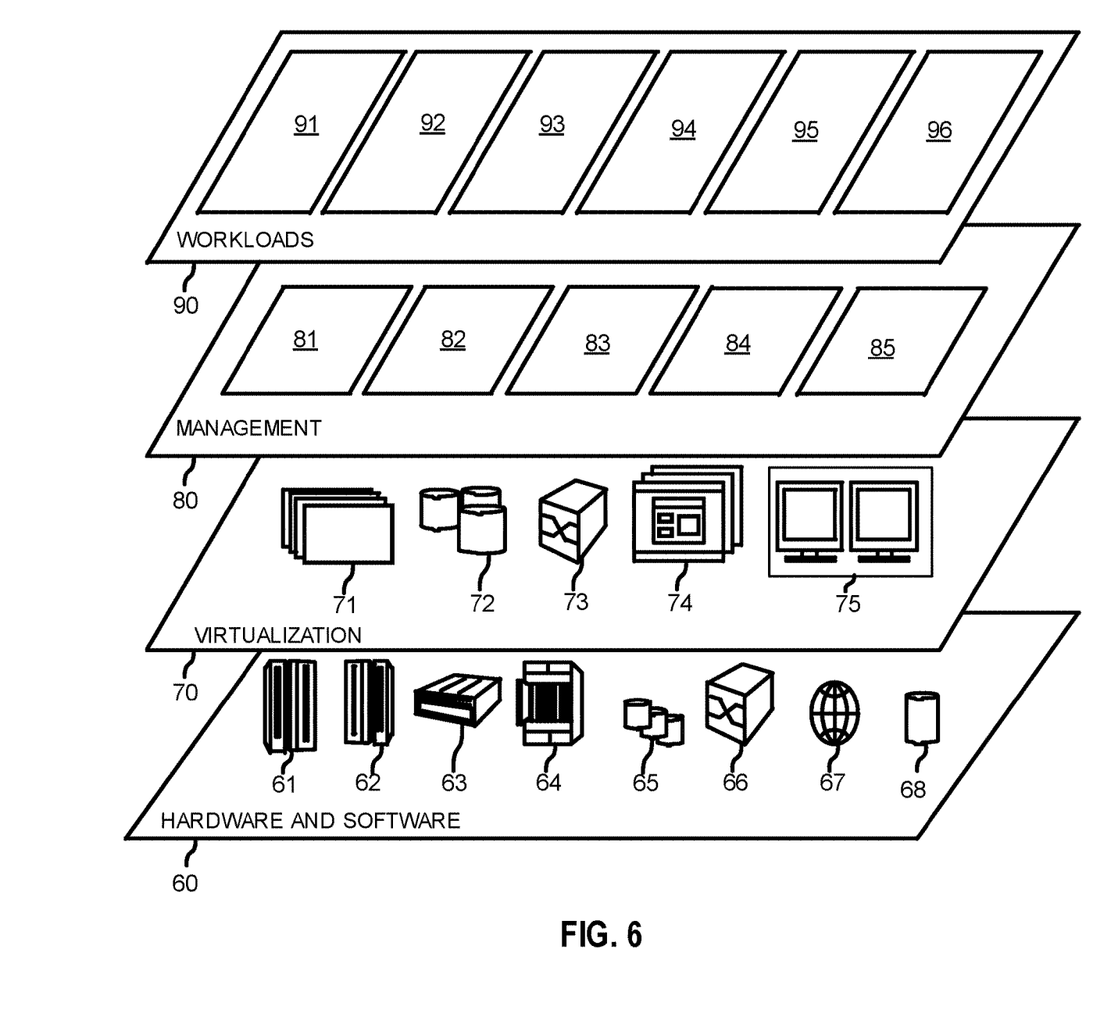
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and virtual reality simulation processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   generating a virtual reality environment for a simulated activity;
   monitoring interactions of a first user within the virtual reality environment, the interactions of the user being performed to engage in the simulated activity;
   based on the interactions of the first user, identifying one or more simulated devices used during the simulated activity;
   monitoring interactions of a set of users, the set of users interacting with the first user within the virtual reality environment;
   based on the interactions of the set of users, identifying a set of simulated devices used by the set of users during the simulated activity;
   determining a set of device characteristics for the one or more simulated devices and the set of simulated devices, the set of device characteristics for the one or more simulated devices and the set of simulated devices being determined based on the interaction of the set of users and the set of simulated devices;
   determining a set of simulated configurations for the one or more simulated devices, the set of simulated devices, and the set of device characteristics; and
   matching a set of configurations for one or more physical devices to the set of simulated configurations for the one or more simulated devices and the set of simulated devices.

2. The method of claim 1, wherein the set of device characteristics include one or more resources used by the set of simulated devices, one or more configurations of the set of simulated devices, and one or more connectivity type between simulated devices of the set of simulated devices.

3. The method of claim 1, wherein monitoring the interactions of the user further comprise:
   determining an involvement level of the user during the simulated activity;
   determining a duration of the interactions of the user during the simulated activity; and
   determining a criticality of the interactions of the user during the simulated activity.

4. The method of claim 1, wherein, in response to an event identification, the set of configurations for the one or more physical devices are automatically matched to the set of simulated configurations for the one or more simulated devices.

5. A system, comprising:
   one or more processors; and
   a computer-readable storage medium, coupled to the one or more processors, storing program instructions that, when executed by the one or more processors, cause the one or more processors to perform operations comprising:
      generating a virtual reality environment for a simulated activity;
      monitoring interactions of a first user within the virtual reality environment, the interactions of the user being performed to engage in the simulated activity;
      based on the interactions of the first user, identifying one or more simulated devices used during the simulated activity;
      monitoring interactions of a set of users, the set of users interacting with the first user within the virtual reality environment;
      based on the interactions of the set of users, identifying a set of simulated devices used by the set of users during the simulated activity;
      determining a set of device characteristics for the one or more simulated devices and the set of simulated devices, the set of device characteristics for the one or more simulated devices and the set of simulated devices being determined based on the interaction of the set of users and the set of simulated devices;
      determining a set of simulated configurations for the one or more simulated devices, the set of simulated devices, and the set of device characteristics; and
      matching a set of configurations for one or more physical devices to the set of simulated configurations for the one or more simulated devices and the set of simulated devices.

6. The system of claim 5, wherein the set of device characteristics include one or more resources used by the set of simulated devices, one or more configurations of the set of simulated devices, and one or more connectivity type between simulated devices of the set of simulated devices.

7. The system of claim 5, wherein monitoring the interactions of the user further comprise:
   determining an involvement level of the user during the simulated activity;
   determining a duration of the interactions of the user during the simulated activity; and
   determining a criticality of the interactions of the user during the simulated activity.

8. The system of claim 5, wherein, in response to an event identification, the set of configurations for the one or more physical devices are automatically matched to the set of simulated configurations for the one or more simulated devices.

9. A computer program product comprising a computer readable storage medium having program instructions embodied therewith, the program instructions being executable by one or more processors to cause the one or more processors to perform operations comprising:
   generating a virtual reality environment for a simulated activity;
   monitoring interactions of a first user within the virtual reality environment, the interactions of the user being performed to engage in the simulated activity;
   based on the interactions of the first user, identifying one or more simulated devices used during the simulated activity;
   monitoring interactions of a set of users, the set of users interacting with the first user within the virtual reality environment;
   based on the interactions of the set of users, identifying a set of simulated devices used by the set of users during the simulated activity;
   determining a set of device characteristics for the one or more simulated devices and the set of simulated devices, the set of device characteristics for the one or more simulated devices and the set of simulated devices being determined based on the interaction of the set of users and the set of simulated devices;
   determining a set of simulated configurations for the one or more simulated devices, the set of simulated devices, and the set of device characteristics; and matching a set of configurations for one or more physical devices to the set of simulated configurations for the one or more simulated devices and the set of simulated devices.

10. The computer program product of claim 9, wherein the set of device characteristics include one or more resources used by the set of simulated devices, one or more configurations of the set of simulated devices, and one or more connectivity type between simulated devices of the set of simulated devices.

11. The computer program product of claim 9, wherein monitoring the interactions of the user further comprise:
- determining an involvement level of the user during the simulated activity;
- determining a duration of the interactions of the user during the simulated activity; and
- determining a criticality of the interactions of the user during the simulated activity.

* * * * *